Patented Mar. 31, 1942

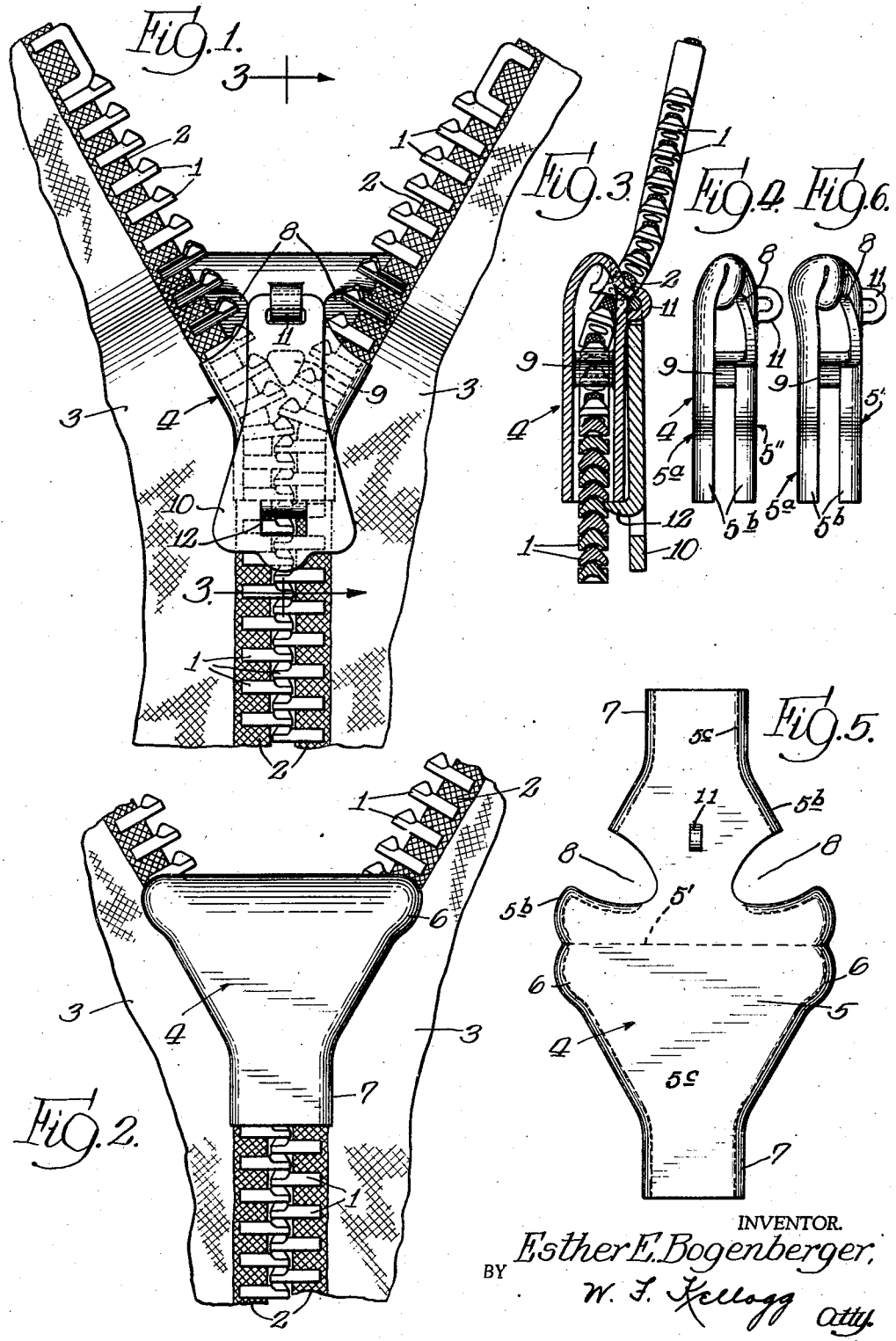

2,278,388

UNITED STATES PATENT OFFICE 2,278,388

SLIDE FASTENER

Esther E. Bogenberger, Milwaukee, Wis., assignor of fifty per cent to Joseph J. Helby, Milwaukee, Wis.

Application November 18, 1940, Serial No. 366,080

5 Claims. (Cl. 24—205)

This invention relates to improvements in separable fasteners and particularly to fasteners of the interdigitating character, having for an object to provide a novel and advantageous form of slide fastener which, when moved or slid for interengaging the fastener elements, will positively prevent undesirable engagement of foreign objects or portions of foreign objects by or between the same; moreover, will as effectually avoid impedance from like foreign objects or portions thereof, when slid in that direction necessary to disengage such elements, hence, assuring constant free and effectual functioning of the slide fastener.

It is also an object of the invention to provide a slide fastener of the indicated character of such formation or shape as will cause overall deflecttion of any and all foreign or motion impeding objects away therefrom.

Another object of the invention is to provide a slide or separable fastener wherein introduction of the fastener elements thereinto will be effected inwardly of its leading edge and in an outwardly angular direction away from the fastener, thus, positively shielding the same, during such times, from extraneous objects or portions of a user's body over which the fastener elements are being engaged, consequently, avoiding interference with their interengagement as well as preventing pinching or tearing of the flesh of a user's body therebetween.

Yet another object of the invention resides in the provision of a slide fastener of the stated character so constructed that it may be adapted for use in conjunction with the standard design or types of separable fastener elements now commonly used in interdigitating fasteners.

A still further object of the invention resides in providing the fastener with a novel form of locking device so operable, following adjustment of the slide fastener, as to fixedly, though releasably lock the same against further and undesirable movement which would permit disengagement of the previously engaged fastener elements.

Other objects of the invention will be in part obvious and in part pointed out.

In order that the invention and its mode of operation may be readily understood by those skilled in the art to which it appertains, I have in the accompanying drawing and the detailed description based thereupon, set out several embodiments of my invention.

In this drawing:

Figure 1 is a front elevation of my improved fastener showing certain of the separable fastener elements in disengaged relationship.

Figure 2 is a rear elevation of the same.

Figure 3 is a longitudinal section through the fastener taken on the line 3—3 of Figure 1, looking in the direction in which the arrows point.

Figure 4 is a side elevation of the fastener.

Figure 5 is a plan view of the blank from which the body of the improved slide is formed; and Figure 6 is a side elevation of a slightly modified form of leading edge of the improved slide.

Having more particular reference to the drawing in connection with which like characters of reference designate corresponding parts throughout, the fastener construction in connection with which my improved slide guard is used, comprehends rows of intercooperative fastener elements, generally designated by the numeral 1, preferably carried upon bed means or tapes 2 in series relationship; the tapes 2, of course, serving as means whereby the fastener elements may be attached to the marginal portions of fabrics, etc. 3. The relatively opposed series of tape carried fastener elements 1, as will be noted upon reference to the Figure 1, are arranged in equispaced relation upon their respective bed means and, at times, are adapted to be brought into interlocking engagement through movement of a slide fastener, indicated in its entirety by the numeral 4, therealong and thereover, and likewise, to be separated or disjoined by reverse movement of such slide fastener, as is usual in the art.

The slide fastener consists of a sheet metal or like body 5, having its opposite sides curved outwardly, as indicated at 6, and the opposite ends thereof reduced in their respective widths, as at 7. Inwardly disposed and relatively opposed ways 8 are formed in the opposite side portions of the body 5 beyond or outwardly of the central or wider part thereof.

The body 5 of the slide fastener is bent transversely upon itself along the line 5' (see Figure 5) somewhat inwardly of the arrangement of the opposed ways 8 therein, and when so bent, it will be noted that the same provides a substantially U-shaped casing-like device or slide having front and rear faces 5" and 5ª respectively, whose normally leading or forward edge is disposed beyond and outwardly of the relatively opposed ways 8 now arranged in the normally outer face of the same. Also, the now substantially juxtaposed curved sides 6 and the reduced portions 7 of the slide fastener body 5 are provided with longitudinally disposed channels or ways, preferably, by inwardly flanging the marginal portions of the body as indicated at 5ᵇ along the dotted line 5ᶜ shown in Figure 5. The respective widths of these ways are such that they will snugly receive and cause interengagement of the fastener elements 1 passing therethrough and also, by such embracing engagement, will maintain contact therewith during sliding movement of the fastener 4. A pin 9 is carried upon the normally inner side and intermediate portion of the body 5 of the fastener 4 and is secured to the opposite and normally outer side thereof, serving not only as means for effectually securing the fastener 4 in proper relationship to the fastener elements 1, but also, as a form of guide or deflector for directing the interdigitating fastener elements 1 into converging interengagement upon sliding movement of the same in one direction. Conversely, when reverse sliding movement of the slide fastener 4 is effected, the pin or deflector 9 will serve to direct the tape carried fastener elements 1 in substantially diverging paths of travel through the inwardly disposed ways 8, aforesaid hence disengaging them.

To facilitate the imparting of sliding motion in the desired direction to the slide fastener 4, I provide a finger piece 10 upon its normally outer side and intermediate portion pivotally engaging it, at one end, with an out-struck or other suitably formed attaching and bearing means 11 carried on one end of said fastener 4 adjacent though slightly inwardly of its normally leading edge. The finger piece 10 is of substantially flat tongue-like formation and has a latch 12 struck inwardly from the outer or free portion thereof, substantially at right angles thereto, so that when the finger piece 10 is swung into substantial parallelism with its adjacent side of the slide fastener 4, said latch 12 will engage over the adjacent edge of said side between the adjacent interengaged fastener elements 1. Thus, in so long as engagement between said latch 12 and interengaged fastener elements 1, is maintained, the slide fastener 4 will be prevented from sliding with respect to the fastener elements and therefore, will assure their retention in interengaged or fastened relationship. By swinging the finger piece 10 outwardly, its latch 12 will be disengaged from between the previously contacted fastener elements 1; therefore, sliding movement of the slide fastener 4 will be permitted.

By reason of the formation and arrangement of the oppositely disposed ways 8 in the body portion 5 of the slide fastener 4, it will be seen that they will be positioned well beyond or inwardly of the normally forward or leading edge of said fastener 4. Hence, as said fastener is advanced to interengage the separable fastener elements 1, they will be introduced through the ways 8 in an outwardly angular direction away from the fastener and moreover, will be entirely shielded from any and all possible contact with foreign objects during such engagement. It will be also noted that as the slide fastener 4 is advanced over the fastener elements 1, outward movement, i. e., movement away from the to be traversed surface, will be imparted to the same through the now engaged finger piece 10, particularly, because of its pivotal mounting adjacent the leading edge of the slide 4 outwardly of the opposed ways 8 therein, thus allowing the inner side or guard portion of the slide fastener to be lightly drawn over that object or surface adjacent thereto. Consequently, if irregularities or the like are encountered by the guard portion of the slide fastener as it is advanced or slid, the same will prevent that impedance which would be otherwise encountered and too, will effectually prevent foreign objects or any portions thereof from becoming engaged between the interengaging fastener elements.

If desired, to facilitate free or uninterrupted movement of the normally inner side or guard portion of the slide fastener 4 over an adjacent object or surface, the normally forward or leading portion of said inner side or guard part of the fastener 4 may be slightly outwardly bent, bowed or curved, whereby to provide it with skidlike deflecting means. Also, it will be noted that the normally outer side of the slide fastener 4, i. e., that is, its body 5, is sufficiently spaced away from the opposite or normally inner side thereof to provide ample room for the entry of the fastener elements 1 through the oppositely disposed ways 8 during sliding movement of said fastener 4 in either direction, and that consequently upon the relative spacing of the leading portions of the sides of said fastener 4, its leading edge will be reduced in thickness or feathered, hence, further facilitating smooth sliding movement of the slide fastener in that path of travel effected by the same during interconnecting of the fastener elements 1. Of course, if desired, instead of this reduced or feathered leading edge of the fastener 4, the same may be definitely rounded as shown in the Figure 6, and in this way, serve as an effectual buffing or deflecting means whereby to prevent or at least reduce to minimum, impedance of its forward sliding motion.

From the foregoing, it will be appreciated that by reason of the construction of my improved slide fastener, the same may be advantageously used in connection with interdigitating fasteners for usage in connection with corsets, girdles, sleeping garments for adults and children, etc. In fact, the device is particularly advantageous for use in connection with any form of device or garment where it becomes highly desirable and even essential that movement of the slide fastener will not be interfered with and that portions of objects or surfaces over which said slide fastener may pass shall not be engaged by or between the fastener elements 1 as they are moved into interengaging relationship.

Manifestly, the construction shown is capable of further modification, and such modification as is within the scope of my claims, I consider within the spirit of my invention.

I claim:

1. A slide fastener of the character described, comprising a body having inner and outer sides providing therebetween a passageway for fastener elements, said outer side having oppositely disposed ways formed therein inwardly of its leading portion for admitting the fastener elements to said passageway, and finger engaging means connected to the outer side of said body inwardly of its leading portion.

2. A slide fastener of the character described, comprising a body having inner and outer sides providing therebetween a passageway for fastener elements, the leading portion of the body being comparatively wide and its opposite portion comparatively width reduced, said outer side of the body having oppositely disposed marginally opening ways formed therein inwardly of its leading portion, and finger engaging means connected to the outer side of said body inwardly of said leading portion.

3. A slide fastener of the character described, comprising a body having inner and outer sides providing therebetween a passageway for fastener elements, the leading portion of said body being feathered, said outer side of the body having oppositely disposed and marginally opening ways formed therein and arranged inwardly of its feathered portion and communicating with said passageway, and finger engaging means connected to the outer side of said body inwardly of its leading portion.

4. A slide fastener of the character described, comprising a body having inner and outer sides providing therebetween a passageway for fastener elements, the leading portion of the body being of buffer-like formation and the outer side of said body having relatively transversely opposed ways formed in its relatively opposite sides inwardly of the body buffer-like formation, and a finger engaging means connected to the outer side of said body adjacent its said leading edge and normally outwardly of said ways.

5. A slide fastener of the character described, comprising a body having inner and outer sides providing therebetween a longitudinal passageway for fastener elements, the normally leading end portion of the body inner side being outwardly curved upon itself into engagement with the corresponding end portion of the body outer side, said body outer side having opposed transversely arranged ways formed therein intermediately of its opposite end portions communicating with said longitudinal passageway, and finger engaging means connected to the body outer side spaced inwardly of the leading end portion thereof.

ESTHER E. BOGENBERGER.